(12) United States Patent
Petrisor

(10) Patent No.: US 8,689,264 B2
(45) Date of Patent: Apr. 1, 2014

(54) SEAT END PROGRAM CACHE UPDATES FOR INFLIGHT ENTERTAINMENT SYSTEM

(71) Applicant: Gregory C. Petrisor, Los Angeles, CA (US)

(72) Inventor: Gregory C. Petrisor, Los Angeles, CA (US)

(73) Assignee: Lumexis Corporation, Irvine, CA (US)

( * ) Notice: Subject to any disclaimer, the term of this patent is extended or adjusted under 35 U.S.C. 154(b) by 0 days.

(21) Appl. No.: 13/629,851

(22) Filed: Sep. 28, 2012

(65) Prior Publication Data

US 2013/0081091 A1 Mar. 28, 2013

Related U.S. Application Data

(60) Provisional application No. 61/626,534, filed on Sep. 28, 2011.

(51) Int. Cl.
*H04N 21/214* (2011.01)
*H04N 7/18* (2006.01)

(52) U.S. Cl.
USPC .................................. 725/77; 725/76; 725/75

(58) Field of Classification Search
None
See application file for complete search history.

(56) References Cited

U.S. PATENT DOCUMENTS

| | | | | |
|---|---|---|---|---|
| 2005/0132407 | A1* | 6/2005 | Boyer et al. | 725/77 |
| 2005/0256616 | A1* | 11/2005 | Rhoads | 701/1 |
| 2008/0092168 | A1* | 4/2008 | Logan et al. | 725/44 |
| 2009/0077594 | A1* | 3/2009 | Milosevski et al. | 725/76 |
| 2009/0138920 | A1* | 5/2009 | Anandpura | 725/76 |
| 2010/0235866 | A1* | 9/2010 | Jangid | 725/76 |
| 2012/0090011 | A1* | 4/2012 | Ezaki et al. | 725/76 |
| 2012/0137325 | A1* | 5/2012 | Ogilvie | 725/38 |
| 2012/0167148 | A1* | 6/2012 | Healy et al. | 725/77 |
| 2012/0298737 | A1* | 11/2012 | Thakar et al. | 235/375 |
| 2013/0055321 | A1* | 2/2013 | Cline et al. | 725/77 |

* cited by examiner

*Primary Examiner* — Scott Beliveau
*Assistant Examiner* — Cynthia Fogg
(74) *Attorney, Agent, or Firm* — Scot A. Reader

(57) ABSTRACT

An inflight entertainment system and method for use therein reduce the loading time required to preload programs identified in playlists onto seat end equipment. Loading time is reduced by retaining programs included in playlists on seat end equipment across flights and making incremental updates to such programs to account for changes in playlists, rather than updating them wholesale for each flight. Loading time is further reduced by adding programs to seat end equipment for the current flight, where possible, by copying such programs from other seat end equipment, rather than copying them from head end equipment.

18 Claims, 2 Drawing Sheets

SEAT END PROGRAM CACHE UPDATES FOR INFLIGHT ENTERTAINMENT SYSTEM

CROSS-REFERENCE TO RELATED APPLICATION

This application claims the benefit of U.S. provisional application No. 61/626,534 entitled "SEAT END CACHED CONTENT UPDATES FOR INFLIGHT ENTERTAINMENT SYSTEM," filed on Sep. 28, 2011, the contents of which are incorporated herein by reference.

BACKGROUND OF THE INVENTION

Inflight entertainment (IFE) systems have evolved significantly over the last 25 years. Prior to 1978, IFE systems consisted of audio-only systems. In 1978, Bell and Howell (Avicom Division) introduced a group viewing video system based on VHS tapes. In 1988, Airvision introduced the first in-seat video system allowing passengers to choose among several channels of broadcast video. In 1997, Swissair installed the first interactive video on demand (VOD) system. Currently, many IFE systems provide VOD with full digital video disc (DVD)-like passenger controls.

Most IFE systems are head end centric. In head end centric IFE systems, passengers using seat end equipment access selected prerecorded video programs (e.g., movies, television shows, video games, etc.) from head end equipment "on demand" during the flight by sending program requests that are fulfilled by the head end equipment. The head end equipment fans-out the selected prerecorded video programs to the seat end equipment over a distribution system. In order for these IFE systems to remain fully operational, the head end equipment, distribution system and seat end equipment must all remain operational. Moreover, if the head end equipment or the distribution system becomes inoperable during a flight, the entire IFE system goes down. Unfortunately, this is a fairly common occurrence in many deployed head end centric IFE systems. To address these problems, seat end centric IFE systems have been proposed.

In seat end centric IFE systems, seat end equipment hosts a complete library of prerecorded video programs. The head end equipment and the distribution system are used primarily for preloading the complete video library onto the seat end equipment. The IFE system remains operational during a flight as long as the seat end equipment remains powered, eliminating the risk that the IFE system will become inoperable in flight due to a head end equipment or distribution system failure. However, seat end centric IFE systems have the major drawback that the entire video library must be copied to each seat (typically 200 to 500 seats) or at least each seat group, whereas in head end centric IFE systems copying of the entire video library is generally only performed a few times on head end equipment for the sake of redundancy. Therefore, proposed seat end centric IFE systems require far more storage capacity and loading time than head end centric IFE systems.

In a compromise between head end centric and seat end centric IFE systems, IFE systems have been proposed that preload part of the video library from the head end equipment to the seat end equipment. In these compromise systems, playlists identifying subsets of programs from the video library are selected and the identified programs are downloaded to each passenger seat. The playlists may be customized for each flight or each passenger based on program popularity, passenger demographics and/or passenger preferences. While these systems do not risk the system wide outages of head end centric IFE systems and do not require the large storage capacity of seat end centric IFE systems, the loading time required to preload programs from playlists to each passenger seat on each flight can be very extensive.

SUMMARY OF THE INVENTION

The present invention provides an IFE system and method for use therein that reduce the loading time required to preload programs identified in playlists onto seat end equipment. Loading time is reduced by retaining programs included in playlists on seat end equipment across flights and making incremental updates to such programs to account for changes in playlists, rather than updating them wholesale for each flight. Accordingly, programs common to a playlist for a seat on the last flight and the playlist for the seat on the current flight are retained on the seat for the current flight. Programs that were on the playlist for the seat on the last flight but not the playlist for the seat on the current flight are removed from the seat for the current flight. Programs that were not on the playlist for the seat on the last flight but are on the playlist for the seat on the current flight are added to the seat for the current flight. Moreover, loading time is further reduced by adding programs to seat end equipment for the current flight, where possible, by copying such programs from other seat end equipment, rather than copying them from head end equipment.

In one aspect of the invention, a method for updating seat end inflight entertainment system program caches, comprises the steps of generating for a current flight playlists for individual passenger seats; selecting a prerecorded program stored on head end equipment; identifying seats whose playlists include the program; identifying seats, if any, having the program stored from a previous flight; identifying seats whose playlists include the program and which do not have the program stored from a previous flight; and copying the program to the seats whose playlists include the program and which do not have the program stored from a previous flight.

In some embodiments, the copying step further comprises copying the program from one of the identified seats having the program stored from a previous flight to one of the identified seats whose playlist includes the program and which does not have the program stored from a previous flight.

In some embodiments, the copying step further comprises identifying an optimum seat from a multiple of identified seats having the program stored from a previous flight and copying the program from the optimum seat to one of the identified seats whose playlist includes the program and which does not have the program stored from a previous flight.

In some embodiments, the copying step further comprises generating by the head end equipment a copy sequence for copying the program to a multiple of identified seats whose playlists include the program and which do not have the program stored from a previous flight.

In some embodiments, the copying step further comprises downloading the copy sequence from the head end equipment to one of the identified seats having the program stored from a previous flight, whereupon the one of the identified seats having the program stored from a previous flight identifies using the copy sequence a first one of the identified seats whose playlist includes the program and which does not have the program stored from a previous flight and copies the program to the first one of the identified seats.

In some embodiments, the copying step further comprises downloading the program and the copy sequence from the head end equipment to a first one of the identified seats whose playlist includes the program and which does not have the program stored from a previous flight, whereupon the first one of the identified seats whose playlist includes the program and which does not have the program stored from a previous flight identifies using the copy sequence a second one of the identified seats whose playlist includes the program and which does not have the program stored from a previous flight and copies the program to the second one of the identified seats.

In some embodiments, the method further comprises the steps of identifying seats, if any, whose playlists do not include the program and which have the program stored from a previous flight; and removing the program from the seats, if any, whose playlists do not include the program and which have the program stored from a previous flight.

In some embodiments, the removing step further comprises generating by the head end equipment a delete instruction; and downloading the delete instruction from the head end equipment to one of the identified seats whose playlist does not include the program and which has the program stored from a previous flight, whereupon the one of the identified seats whose playlist does not include the program and which has the program stored from a previous flight executes the delete instruction to remove the program.

In some embodiments, each of the individual passenger seats is associated with a seatback video display unit (VDU) having a program cache for storing programs included in a playlist for the individual passenger seat.

In some embodiments, the playlists are generated using program popularity data.

In some embodiments, the playlists are generated using passenger demographic data.

In some embodiments, the playlists are generated using passenger preference data.

In another aspect of the invention, an IFE system comprises head end equipment and seat end equipment configured to implement the foregoing methods.

These and other aspects will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
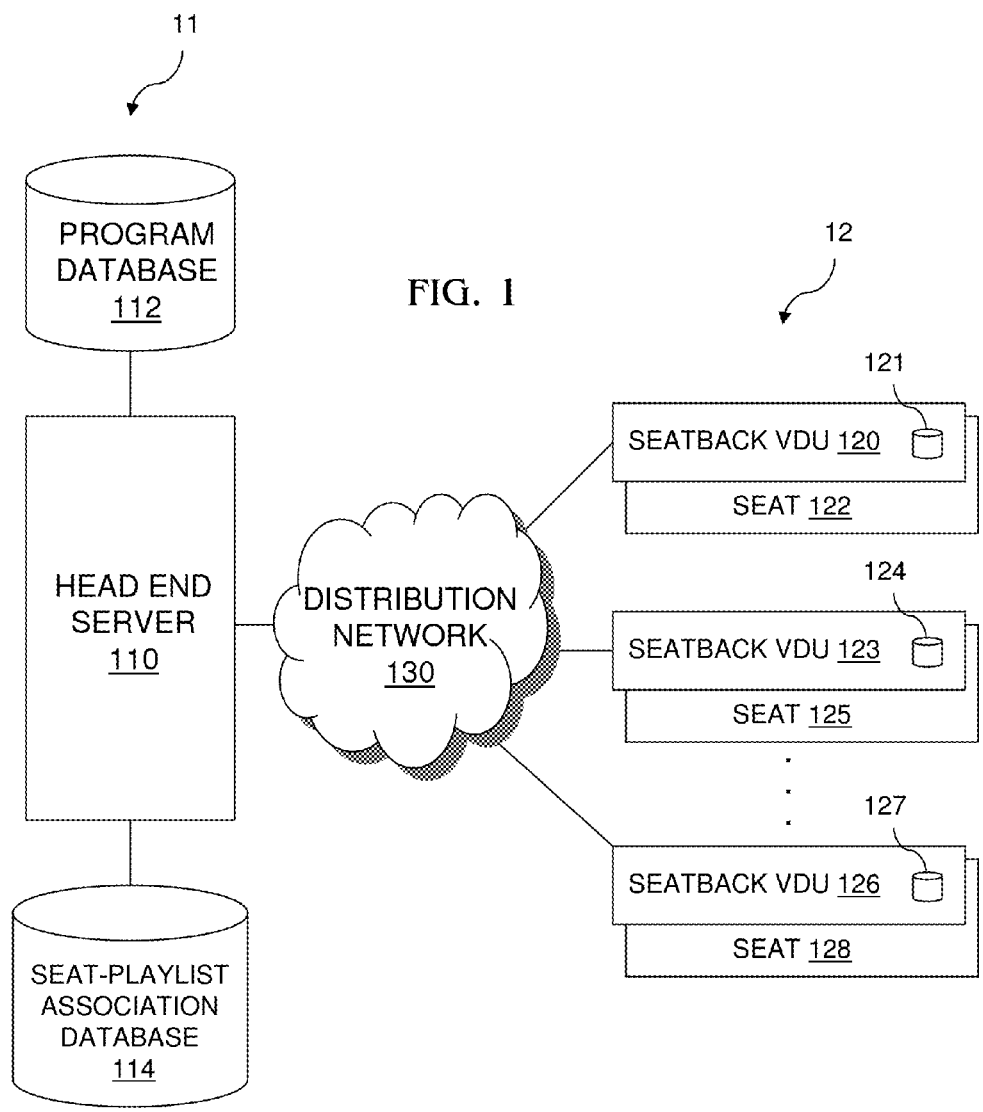
FIG. 1 shows an IFE system in some embodiments of the invention.

FIG. 1 shows an IFE system in some embodiments of the invention. The IFE system is installed on an airplane, such as a jumbo jet or regional jet. The IFE system includes head end equipment 11, seat end equipment 12 and a distribution network 130. Head end equipment 11 includes a head end server 110, a program database 112 and a seat-playlist association database 114. Seat end equipment includes a multiple of seatback VDUs 120, 123, 126.

Head end server 110 is communicatively coupled with seatback VDUs 120, 123, 126 over distribution network 130. Seatback VDUs 120, 123, 126 are associated with passenger seats 122, 125, 128, respectively. Seatback VDUs 120, 123, 126 are mounted in passenger seats directly in front of seats 122, 125, 128 to enable viewing of IFE system content by passengers sitting in seats 122, 125, 128. Seatback VDUs 120, 123, 126 have respective program caches 121, 124, 127 configured to store programs included in playlists for their respective seats 122, 125, 128.

Program database 112 has stored thereon a library of prerecorded video programs, such as movies, television programs and video games. The programs may be uploaded onto program database 112 from removable media (e.g., disk or tape) or offboard network, by way of example.

Seat-playlist association database 114 has stored thereon entries associating individual ones of seats 122, 125, 128 with playlists for the last flight and the current flight. The entries are managed by head end server 110. Each playlist identifies a subset of the prerecorded video programs stored in program database 112 and is customized by head end server 110 for the passenger assigned to the one of seats 122, 125, 128. Programs are selected for playlists using program selection data, such as program popularity data, passenger demographic data and passenger preference data. Program selection data may be received from various sources. For example, head end server 110 may receive program selection data from an offboard network, onboard network, seatback VDUs 120, 123, 126 or passenger control units (PCUs) associated with seatback VDUs 120, 123, 126. Where program selection data is received from seatback VDUs 120, 123, 126 or PCUs, such data may have been inputted by passengers. Alternatively, program selection data may be packaged with programs loaded in program database 112 from removable media. Program selection data may reflect program popularity, passenger demographics and passenger preferences specific to an airline, a flight leg, or a passenger assigned to one of seats 122, 125, 128. Passenger preference data may include, by way of example, language and subject matter preferences gleaned from a passenger's responses to survey questions and past content selection history.

Prior to enabling the IFE system for the each flight, head end server 110 generates playlists for the flight and defines and implements an optimal strategy for updating program caches 121, 124, 127 to conform with the playlists. Head end server 110 accesses playlists for seats 122, 125, 128 for the current flight and the last flight from seat-playlist association database 114 and accesses programs from program database 112 as needed to define and implement the strategy. The update strategy is designed to reduce loading time by retaining programs stored on program caches 121, 124, 127 from the last flight and making incremental updates to program caches 121, 124, 127 to account for differences between the playlists for seats 122, 125, 128 for the last flight and the current flight. For example, programs common to the playlist for a seat 122 on the last flight and the playlist for seat 122 on the current flight are retained in program cache 121 for the current flight. Programs that were on the playlist for seat 122 on the last flight but not the playlist for seat 122 on the current flight are removed from program cache 121 for the current flight. Programs that were not on the playlist for seat 122 on the last flight but are on the playlist for seat 122 on the current flight are added to program cache 121 for the current flight. Moreover, the update strategy is designed to further reduce loading time by adding programs to program caches 121, 124, 127, where possible, by copying such programs from seats that already have the programs stored thereon rather than downloading such programs from head end server 110, which could create a bottleneck at the interface between head end server 110 and distribution network 130.

Head end server 110, seatback VDUs 120, 123, 126 and distribution network 130 perform their respective operations described herein by executing software instructions under microprocessor control, or in custom circuitry, or a combination thereof. Moreover, the features described as being performed by head end server 110 herein may be distributed across a multiple servers.

Figure 2:
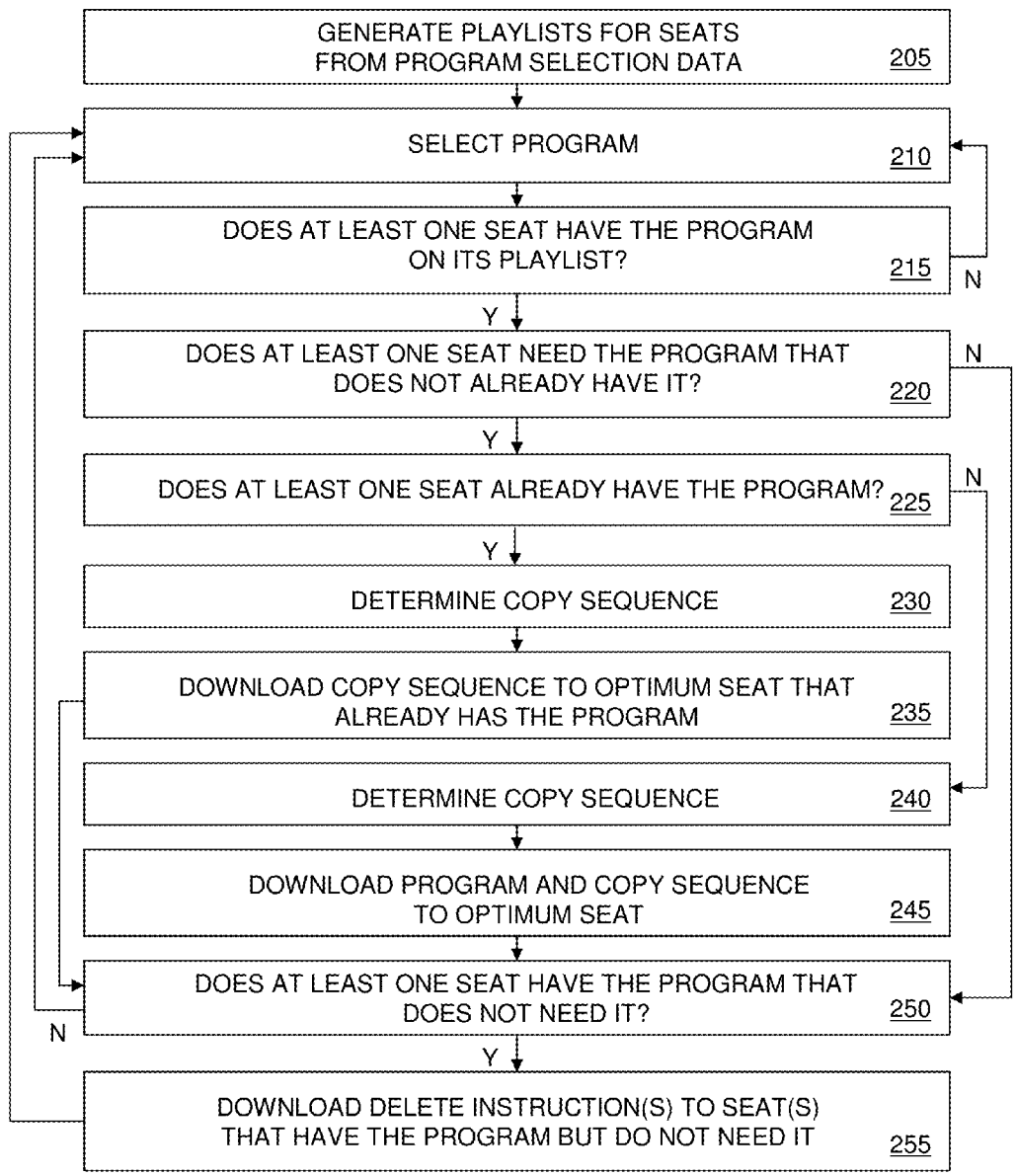
FIG. 2 shows a method for updating seat end IFE system program caches in some embodiments of the invention.

FIG. 2 shows a method for updating seat end IFE system program caches 121, 124, 127 in some embodiments of the invention. The method is performed by the head end server 110, in conjunction with program database 112 and seat-playlist association database 114, prior to enabling the IFE system for each flight.

At the outset, head end server 110 acquires program selection data and generates playlists for seats 122, 125, 128 from the program selection data (205). Head end server 110 stores the playlists in association with identifiers of seats 122, 125, 128 in seat-playlist association database 114. Each playlist identifies a subset of prerecorded video programs stored in program database 112, customized for the passenger assigned to one of seats 122, 125, 128 on the current flight. Programs are selected for each playlist using program selection data such as program popularity data, passenger demographic data and passenger preference data. Seat-playlist association database 114 retains the playlists generated for each one of seats 122, 125, 128 for the last flight and for the current flight.

Next, head end server 110 selects a program stored in program database 112 (210) and identifies from entries in seat-playlist association database 114 seats that include the selected program on their playlists for the current flight (215).

If at least one seat includes the selected program on its playlist for the current flight, head end server 110 determines whether at least one seat on the current flight that includes the selected program on its playlist does not already have the program stored in its associated program cache (220).

If at least one seat that includes the selected program on its playlist for the current flight does not already have the program stored in its associated program cache, head end server 110 determines whether at least one seat already has the program stored in its associated program cache from the last flight (225).

If at least one seat already has the program stored in its associated program cache, head end server 110 determines a copy sequence specifying an order for copying the program from an optimum seat that already has the program stored in its associated program cache to seats that need the program (230) and downloads a copy instruction containing the copy sequence to the optimum seat (235), whereupon the program is copied to the seats that need the program in accordance with the copy sequence. Head end server 110 selects an optimum seat and copy sequence that head end server 110 estimates will minimize network bandwidth usage, loading time, or both. If only one seat needs the program, a copy sequence is not required and a copy instruction downloaded by head end server 110 to the one seat may instruct to copy the program to only one seat without further action. Furthermore, if multiple seats need the program but head end server 110 determines that it is more efficient at the present time to copy the program to only one seat that needs the program, a copy sequence is not required and a copy instruction downloaded by head end server 110 to the one seat may instruct to copy the program to only one seat without further action. Copying of the program results in the program becoming stored in the program cache on the seatback VDU associated with the seat to which the program is copied.

In some embodiments, the optimum seat copies the program to all seats that need the program in accordance with the copy sequence.

In some embodiments, the optimum seat copies the program to a first seat in the copy sequence, which in turn copies the program to a second seat in the copy sequence, and so on, until the program has been copied to all seats in the copy sequence.

In some embodiments, multiple copy commands are executed in parallel for the same program. In these embodiments, head end server 110 downloads multiple copy instructions each instructing a seat that already has the program stored in its associated program cache to copy the program to a subset of seats that need the program. Head end server 110 selects these copy instructions to be non-interfering.

Moreover, some embodiments, multiple copy instructions are executed in parallel for different programs. In these embodiments, head end server 110 downloads multiple copy instructions each instructing to copy one of the programs from a seat that already has the program to seats that need the program. Head end server 110 selects these copy instructions to be non-interfering.

Next, head end server 110 identifies from entries in seat-playlist association database 114 seats that have the selected program stored in their associated program caches but do not have the selected program on their playlists for the current flight (250).

If at least one seat has the selected program stored in its associated program cache but does not have the selected program on their playlist for the current flight, head end server 110 downloads a delete instruction to each such seat (255), whereupon the selected program is deleted from the program caches associated with such seats. Deletion of the program results in the program being removed from the program caches on the seatback VDUs associated with the seats to which deletion instructions have been downloaded. At that point, the method flow returns to Step 210 and is repeated for another program until all programs have been selected.

If for a selected program head end server 110 determines at Step 215 that no seat has the program on its playlist, the method flow returns to Step 210 where head end server 110 selects the next program.

If for a selected program head end server 110 determines at Step 220 that no seat needs the program that does not already have it, the method flow advances to Step 250 where head end server 110 determines whether at least one seat has the program that no longer needs it (250), and if so, downloads a delete instruction to each seat that has the program but no longer needs it (255).

If for a selected program head end server 110 determines at Step 225 that no seat already has the program, the method flow advances to Step 240 where head end server 110 determines a copy sequence specifying an order for copying the program from an optimum seat that needs the program to other seats that need the program (240) and downloads the program and a copy instruction having the copy sequence to the optimum seat (245), whereupon the program is first stored locally in the program cache associated with the optimum seat and then copied to the other seats that need the program in accordance with the copy sequence, after which the method flow proceeds to Step 250.

Finally, if for a selected program head end server 110 determines at Step 250 that no seat has the program that no longer needs it, the method flow returns to Step 210 without downloading a delete instruction respecting the program to any seat.

It will be appreciated by those of ordinary skill in the art that the invention can be embodied in other specific forms without departing from the spirit or essential character hereof. For example, in some embodiments, the program caches are housed in a seat electronics box associated with a seat group rather than in a seatback VDU. Moreover, in some embodiments, the server that performs the method of FIG. 2 and the seat-content associations may reside at the seat end or in the distribution network. Furthermore, in some embodiments a copy from source to destination may be executed from either the source or destination. The present description is therefore considered in all respects to be illustrative and not restrictive. The scope of the invention is indicated by the appended claims, and all changes that come with in the meaning and range of equivalents thereof are intended to be embraced therein.

What is claimed is:

1. A method for updating seat end inflight entertainment system program caches, comprising:
    generating current flight playlists for individual passenger seats;
    selecting a prerecorded program;
    identifying the seats whose current flight playlists include the program but which do not have the program stored from a previous flight;
    generating a seat-to-seat copy sequence for copying the program in sequence to the seats whose current flight playlists include the program but which do not have the program stored from a previous flight;
    wherein the generating step comprises:
        identifying an optimum sequence for copying the program from ones of the seats which have the program stored to ones of the seats whose current flight playlists include the program but which do not have the program stored; and
    executing the copy sequence whereby the program is copied in sequence from ones of the seats which have the program stored to ones of the seats whose current flight playlists include the program but which do not have the program stored.

2. The method of claim 1, further comprising:
    identifying on head end equipment seats which have the program stored from a previous flight;
    generating on the head end equipment the copy sequence; and
    downloading the copy sequence from the head end equipment to one of the seats having the program stored from a previous flight, whereupon the one of the seats identifies using the copy sequence a first one of the seats whose current flight playlist includes the program but which does not have the program stored from a previous flight and copies the program to the first one of the seats.

3. The method of claim 1, further comprising:
    generating on head end equipment the copy sequence; and
    downloading the program and the copy sequence from the head end equipment to a first one of the seats whose current flight playlist includes the program but which does not have the program stored from a previous flight, whereupon the first one of the seats identifies using the copy sequence a second one of the seats whose current flight playlist includes the program but which does not have the program stored from a previous flight and copies the program to the second one of the seats.

4. The method of claim 1, further comprising:
    identifying seats whose current flight playlists do not include the program but which have the program stored from a previous flight; and
    removing the program from the seats whose current flight playlists do not include the program but which have the program stored from a previous flight.

5. The method of claim 4, wherein the removing step comprises:
    generating on head end equipment a delete instruction; and
    downloading the delete instruction from the head end equipment to one of the seats whose current flight playlist does not include the program but which has the program stored from a previous flight, whereupon the one of the seats executes the delete instruction and removes the program from the one of the seats.

6. The method of claim 1, wherein the seats are associated with seatback video display units having program caches for storing programs included in current flight playlists for the seats.

7. The method of claim 1, wherein the current flight playlists are generated using program popularity data.

8. The method of claim 1, wherein the current flight playlists are generated using passenger demographic data.

9. The method of claim 1, wherein the current flight playlists are generated using passenger preference data.

10. An inflight entertainment system, comprising:
    head end equipment configured to generate current flight playlists for individual passenger seats, select a prerecorded program stored on the head end equipment, identify seats whose current flight playlists include the program but which do not have the program stored from a previous flight and generate a seat-to-seat copy sequence for copying the program in sequence to the seats whose current flight playlists include the program but which do not have the program stored from a previous flight, wherein the head end equipment is further configured to identify an optimum sequence for copying the program from ones of the seats which have the program stored to ones of the seats whose current flight playlists include the program but which do not have the program stored; and
    seat end equipment communicatively coupled with the head end equipment and configured to execute the copy sequence whereby the program is copied in sequence from ones of the seats which have the program stored to ones of the seats whose current flight playlists include the program but which do not have the program stored.

11. The system of claim 10, wherein the head end equipment is further configured to identify the seats which have the program stored from a previous flight and download the copy sequence to one of the seats having the program stored from a previous flight, whereupon the one of the seats having the program stored from a previous flight is configured to identify using the copy sequence a first one of the seats whose current flight playlist includes the program but which does not have the program stored from a previous flight and copy the program to the first one of the seats.

12. The system of claim 10, wherein the head end equipment is further configured to download the program and the copy sequence to a first one of the seats whose current flight playlist includes the program but which does not have the program stored from a previous flight, whereupon the first one of the seats is configured to identify using the copy sequence a second one of the seats whose current flight playlist includes the program but which does not have the program stored from a previous flight and copy the program to the second one of the seats.

13. The system of claim 10, wherein the head end equipment is further configured to identify the seats whose current flight playlists do not include the program but which have the program stored from a previous flight and remove the program from the seats whose current flight playlists do not include the program but which have the program stored from a previous flight.

14. The system of claim 13, wherein the head end equipment is further configured to generate a delete instruction and download the delete instruction to one of the seats whose current flight playlist does not include the program but which has the program stored from a previous flight, whereupon the one of the seats executes the delete instruction and removes the program from the one of the seats.

15. The system of claim 10, wherein the seats are associated with seatback video display units having program caches for storing programs included in current flight playlists for the seats.

16. The system of claim 10, wherein the current flight playlists are generated using program popularity data.

17. The system of claim 10, wherein the current flight playlists are generated using passenger demographic data.

18. The system of claim 10, wherein the current flight playlists are generated using passenger preference data.

* * * * *